United States Patent
Wang et al.

(10) Patent No.: US 11,292,901 B2
(45) Date of Patent: Apr. 5, 2022

(54) NUCLEATED C3C4 COPOLYMERS AND NUCLEATED C3C4C2 TERPOLYMERS

(71) Applicant: Borealis AG, Vienna (AT)

(72) Inventors: Jingbo Wang, Linz (AT); Petar Emilov Doshev, Linz (AT); Markus Gahleitner, Linz (AT); Cornelia Anita Tranninger, Linz (AT); Elisabeth Potter, Linz (AT); Johanna Lilja, Porvoo (FI)

(73) Assignee: BOREALIS AG, Vienna (AT)

( * ) Notice: Subject to any disclaimer, the term of this patent is extended or adjusted under 35 U.S.C. 154(b) by 351 days.

(21) Appl. No.: 16/609,485

(22) PCT Filed: Mar. 29, 2018

(86) PCT No.: PCT/EP2018/058210
§ 371 (c)(1),
(2) Date: Oct. 30, 2019

(87) PCT Pub. No.: WO2018/210477
PCT Pub. Date: Nov. 22, 2018

(65) Prior Publication Data
US 2020/0109272 A1 Apr. 9, 2020

(30) Foreign Application Priority Data
May 18, 2017 (EP) .................................... 17171744

(51) Int. Cl.
| | |
|---|---|
| *C08L 23/14* | (2006.01) |
| *C08L 23/20* | (2006.01) |
| *C08L 23/16* | (2006.01) |
| *C08K 5/1565* | (2006.01) |
| *C08K 5/20* | (2006.01) |
| *C08L 25/02* | (2006.01) |

(52) U.S. Cl.
CPC ............ *C08L 23/16* (2013.01); *C08K 5/1565* (2013.01); *C08K 5/20* (2013.01); *C08L 25/02* (2013.01); *C08L 23/14* (2013.01); *C08L 23/20* (2013.01); *C08L 2205/02* (2013.01); *C08L 2205/03* (2013.01); *C08L 2205/24* (2013.01); *C08L 2314/02* (2013.01)

(58) Field of Classification Search
None
See application file for complete search history.

(56) References Cited

U.S. PATENT DOCUMENTS

| | | |
|---|---|---|
| 2006/0155073 A1 | 7/2006 | Oobayashi et al. |
| 2016/0046787 A1 | 2/2016 | Montaletti et al. |

FOREIGN PATENT DOCUMENTS

| | | |
|---|---|---|
| EP | 2020291 A1 | 2/2009 |
| EP | 2778182 A1 | 9/2014 |
| EP | 2960279 A1 | 12/2015 |
| WO | WO 2013083576 A1 | 6/2013 |

OTHER PUBLICATIONS

International Search Report dated Jul. 11, 2018 from PCT/EP2018/058210.

*Primary Examiner* — Richard A Huhn
(74) *Attorney, Agent, or Firm* — Fay Sharpe LLP

(57) ABSTRACT

A propylene butylene polymer composition comprising A) a propylene butylene copolymer or a propylene butylene ethylene terpolymer which is—free of phthalic acid esters as well as decomposition products thereof; —obtained by a Ziegler-Natta catalyst and B) a mixture of at least one particulate and at least one soluble nucleating agent, whereby the propylene butylene polymer composition has—a MFR (2.16 kg/210° C.) in the range of 12 to 50 g/10 min—a tensile modulus (measured on injection moulded test specimens in accordance with ISO 527) of more than 1200 MPa—a Tm of more than 150° C.—an amount of xylene cold soluble (XCS) fraction of less than 7.0 wt.-% and whereby the propylene butylene copolymer includes monomer units derived from a) propylene in an amount of 91-96 wt.-% b) butylene in an amount of 4-9 wt.-% with respect to the total weight of the propylene butylene copolymer. or wherein the propylene butylene ethylene terpolymer includes monomer units derived from a) propylene in an amount of 90-96 wt.-% b) butylene in an amount of 4-9 wt.-% c) ethylene in an amount of not more than 1.0 wt.-% with respect to the total weight of the propylene butylene ethylene terpolymer.

15 Claims, No Drawings

NUCLEATED C3C4 COPOLYMERS AND NUCLEATED C3C4C2 TERPOLYMERS

This is a 371 of PCT/EP2018/058210, filed Mar. 29, 2018, which claims priority to European Patent Application No. 17171744.0, filed May 18, 2017, the contents of which are fully incorporated herein by reference.

The present invention relates to nucleated random propylene-butylene polymer compositions, to a process for producing such compositions and further to articles comprising nucleated random propylene-butylene polymer compositions.

BACKGROUND

Polymers, like polypropylene, are increasingly used in different demanding applications. At the same time there is a continuous search for tailored polymers which meet the requirements of these applications and show good processability. Polymers with higher stiffness can be converted to articles with lower wall thickness, allowing material and energy savings. Polymers with good optical properties, especially low haze, are desired for consumer related articles to provide good "see-through" properties on the content of the packed goods. Polymers with good impact behavior are also desired in consumer related articles and in the medical area to safely keep the content intact when dropped. Good processability is required to ensure short production cycles or uniform filling of the moulds. This is especially important in the case of multi-cavity-tools, complex tool design or long flow paths, as e.g. given in thin walled articles. In several applications in the alimentary or medical industry low amounts of extractable fractions are crucial. In addition to that, packaging in the medical field requires high melting points due to the typical sterilization processes.

The demands can be challenging, since many polymer properties are directly or indirectly interrelated, i.e. improving a specific property can only be accomplished at the expense of another property. As well known in the art stiffness, C6 extractability, and Tm particularly contradict with impact, haze as well as processability.

On top of that many propylene-butylene copolymers have been prepared by high yield Ziegler-Natta catalyst systems (so called fourth and fifth generation type), which comprises a catalyst component, a co-catalyst component and an internal donor based on phthalate-compositions; typical examples for such catalysts being disclosed in U.S. Pat. No. 5,234,879, WO92/19653, WO 92/19658 and WO 99/33843. However, some of these phthalate-compositions are under suspicion of generating negative health and environmental effects. Furthermore, the market simply asks for "phthalate-free polypropylene" suitable for various applications, e.g. in the field of packaging and medical applications as well as personal care, or personal hygiene.

Traditional catalysts have been used in WO2016025326 reporting the preparation of C3C4C2 terpolymers in the presence of polyvinylcyclohexane (PVCH).

Similarly WO2007096209 reports the preparation of proypylene copolymers with traditional Ziegler or Metallocene catalysts having moderately high melting points and being produced in two sequential gas phase reactors.

Recently catalysts with citraconate as internal donor have attracted interest.

WO2017/001479 discloses a polymerization process for obtaining C3C4 copolymers or C3C4C2 terpolymers with a Ziegler Natta catalyst using preferably citraconate as internal donor and tert-alkyl-methoxysilanes as external donor. The co- and terpolymers are prepared by autoclave reactors, used for film but have relatively low melting points.

WO2017/001474 also discloses a polymerization process for obtaining C3C4 copolymers or C3C4C2 terpolymers with a Ziegler Natta catalyst using preferably citraconate as internal donor and iso-propyl-methoxysilanes as external donor. The co- and terpolymers prepared with the phthalate free catalyst system showed poor melting points.

WO2016/198601 also discloses a polymerization process for obtaining C3C4 copolymers or C3C4C2 terpolymers with a Ziegler Natta catalyst using preferably citraconate as internal donor and dicyclopentyldimethoxysilane (donor D) as external donor in two reactors coupled in series. Again the melting points observed for the compositions were rather low and the C6 solubles (FDA) also indicated room for improvement.

WO 2012/007430 also incorporated herein by reference, is one example of a limited number of patent applications, describing phthalate free catalysts based on citraconate as internal donor.

Thus in addition to the above well-known conflict of aims there is also the conflict of providing a "phthalate free material" having a high melting point and simultaneously extremely low C6 (FDA) extractability. Such balance of properties is particularly desirable for compositions having good processability, i.e. relatively high melt flow rate.

Considering the above there is still the need for compositions having a good balance of melting point, C6 (FDA) extractability, processability being obtained with a catalyst free of a phthalate donor, good stiffness as well as impact.

SUMMARY OF THE INVENTION

The present invention is based on the finding that the above mentioned object can be achieved by preparing a propylene butylene copolymer or a propylene butylene ethylene terpolymer with a Ziegler Natta catalyst fee of phthalic acid ester using a mixture of at least one particulate and at least one soluble nucleating agent.

The present invention insofar provides
a propylene butylene copolymer or a propylene butylene ethylene terpolymer composition comprising
A) a propylene butylene copolymer or a propylene butylene ethylene terpolymer which is
  free of phthalic acid esters as well as decomposition products thereof;
  obtained by a Ziegler-Natta catalyst
and
B) a mixture of at least one particulate and at least one soluble nucleating agent,
whereby the propylene butylene copolymer composition has
  a MFR (2.16 kg/210° C.) in the range of 12 to 50 g/10 min
  a tensile modulus (measured on injection moulded test specimens in accordance with ISO 527) of more than 1200 MPa
  a Tm of more than 150° C.
  an amount of xylene cold soluble (XCS) fraction of less than 7.0 wt.-% and whereby the propylene butylene copolymer includes monomer units derived from
  a) propylene in an amount of 91-96 wt.-%
  b) butylene in an amount of 4-9 wt.-%
  with respect to the total weight of the propylene butylene copolymer.

or
wherein the propylene butylene ethylene terpolymer includes monomer units derived from
a) propylene in an amount of 90-96 wt.-%
b) butylene in an amount of 4-9 wt.-%
c) ethylene in an amount of not more than 1.0 wt.-%
with respect to the total weight of the propylene butylene ethylene terpolymer.

Generally speaking nucleating agents for polypropylene can be inorganic (e.g. talc, wollastonite, and mica) or organic. The by far larger class of organic nucleanting agents can be subdivided into three categories: particulate nucleating agents like carboxylic acid salts (benzoates and aromatic organophosphates), soluble nucleating agents like sorbitols and trisamides, and polymeric nucleating agents such as PTFE. Polymeric nucleating agents can also be particulate nucleating agents for example poylvinylcyclohexane or polyvinylcyclopentane. The present invention is further concerned with a process for the preparation of a propylene butylene copolymer composition comprising
(A) a propylene butylene copolymer which is free of phthalic acid esters as well as decomposition products thereof and
(B) a mixture of at least one particulate and at least one soluble nucleating agent,
whereby the propylene butylene polymer composition has
a MFR (2.16 kg/210° C.) in the range of 12 to 50 g/10 min
a tensile modulus (measured on injection moulded test specimens in accordance with ISO 527) of more than 1200 MPa
a Tm of more than 150° C.
an amount of xylene cold soluble (XCS) fraction of less than 7.0 wt.-%
and whereby the propylene butylene copolymer includes monomer units derived from
a) propylene in an amount of 91-96 wt.-%
b) butylene in an amount of 4-9 wt.-%
with respect to the total weight of the propylene butylene copolymer;
the process comprising
polymerizing propylene and butylene in a two reactors coupled in series
using a Ziegler Natta catalyst system
having citraconate as internal donor, an organoaluminium compound, preferably tetraethyl aluminium (TEAL), as co-catalyst, and an organosilane, preferably dicyclopentyldimethoxysilane (donor D), as external donor at a Al/external donor ratio of 5.0-8.0 mol/mol and a Al/Ti ratio of 190 to 240 mol/mol, and further feeding a particulate nucleating agent to at least one reactor,
whereby in a first reactor a pre-polymerization is carried out at 25-35° C. for 10 to 60 minutes yielding a pre-polymer, further polymerizing the pre-polymer at a temperature of 65–75° C., at a C4/C3 ratio of 115 to 145 mol/kmol yielding a first intermediate having an C4 content of 4 to 7 wt.-% and XCS of 2 to 5 wt.-%,
transferring the first intermediate to a second reactor and further polymerizing at 75 to 85° C. at a C4/C3 ratio of 90 to 130 mol/kmol,
to yield the second reactor product,
extruding the second reactor product in the presence of a soluble nucleating agent to yield the propylene butylene copolymer composition.

In a further aspect the present invention is concerned with a process for the preparation of a propylene butylene ethylene terpolymer composition comprising A) a propylene butylene ethylene terpolymer which is free of phthalic acid esters as well as decomposition products thereof;
and
B) a mixture of at least one particulate and at least one soluble nucleating agent,
whereby the propylene butylene ethylene terpolymer composition has
a MFR (2.16 kg/210° C.) in the range of 12 to 50 g/10 min
a tensile modulus (measured on injection moulded test specimens in accordance with ISO 527) of more than 1200 MPa
a Tm of more than 150° C.
an amount of xylene cold soluble (XCS) fraction of less than 7.0 wt.-% and
wherein the propylene butylene ethylene terpolymer includes monomer units derived from
a) propylene in an amount of 90-96 wt.-%
b) butylene in an amount of 4-9 wt.-%
c) ethylene in an amount of not more than 1.0 wt.-%
with respect to the total weight of the propylene butylene ethylene terpolymer
the process comprising
polymerizing propylene, butylenes and ethylene in a three reactors coupled in series
using a Ziegler Natta catalyst system
having citraconate as internal donor, an organoaluminium compound, preferably tetraethyl aluminium (TEAL), as co-catalyst), and an organosilane, preferably dicyclopentyldimethoxysilane (donor D) as external donor at a Al/external donor ratio of 5.0-8.0 mol/mol and a Al/Ti ratio of 190 to 240 mol/mol, and further feeding a particulate nucleating agent to at least one reactor,
whereby in a first reactor a pre-polymerization is carried out at 25-35° C. for 10 to 60 minutes yielding a pre-polymer,
further polymerizing the pre-polymer at a temperature of 65-75° C., at a C4/C3 ratio of 115 to 145 mol/kmol yielding a first intermediate having an C4 content of 4 to 7 wt.-% and XCS of 2 to 5 wt.-%,
transferring the first intermediate to a second reactor and further polymerizing at 75 to 85° C. at a C4/C3 ratio of 80 to 120 mol/kmol to yield the second reactor product,
transferring the second reactor product to a third reactor and further polymerizing at a temperature of 75 to 85° C. at a C2/C3 ratio of 70 to 90 mol/kmol to yield a third reactor product, and
extruding the third reactor product in the presence of a soluble nucleating agent.

In a further aspect the present invention is concerned with compositions as obtained by the described processes.

In yet a further aspect the present invention provides molded articles comprising the inventive composition(s).

From a general point of view the present invention provides compositions with a unique balance of Tm, C6 (FDA), tensile modulus, NIS and also haze.

Definitions

A propylene butylene polymer composition according to the present invention is derived from propylene and butylenes monomer units and may comprise other monomer units, particularly ethylene monomer units.

A propylene butylene copolymer composition denotes a polymer composition which is essentially composed of propylene and butylenes monomer units. It is self-evident that traces of other monomers such as from nucleating agents can be present. Traces means less than 0.5 wt.-% with respect to the total propylene butylene copolymer composition.

A propylene butylene ethylene terpolymer composition denotes a polymer composition which is essentially composed of propylene, butylenes and ethylene monomer units. Again traces of other monomers such as from nucleating agents can be present. Traces again means less than 0.5 wt.-% with respect to the total of the propylene butylene ethylene terpolymer composition.

A particulate nucleating agent is a nucleating agent being present in particle form. A soluble nucleating agent denotes a nucleating agent which does not form particles in the nucleated polymer.

A propylene butylenes copolymer obtained by a Ziegler-Natta catalyst means that the propylene butylenes copolymer is obtained by polymerizing propylene and butylenes in the presence of a Ziegler Natta catalyst. The same holds for propylene butylene ethylene terpolmyer obtained by a Ziegler-Natta catalyst. The propylene butylene ethylene terpolmyer insofar is obtained by polymerizing propylene, butylenes and ethylene in the presence of a Ziegler Natta catalyst.

"Free of phthalic acid esters as well as decomposition products thereof" indicates absence of such components within the well accepted understanding in the art. "Free of phthalic acid esters as well as decomposition products thereof" indicates a maximum of 10 μg/kg, i.e. 10 ppb by weight. Such values have been reported for common soil and river sediments. It is well known for many years that the actual detection limit is lower than the environmental background concentration. Attention is drawn to H. Fromme, T. Küchler, T. Otto, K. Pilz, J. Müller, A. Wenzel Water Research 36 (2002) 1429-1438 which is incorporated by reference herewith. Detection is straightforward by gas chromatography coupled with one- or two-dimensional mass spectrometry (GC-MS respectively GC-MS/MS) optionally preceded by enrichment on a suitable adsorption material.

A Ziegler Natta catalyst system includes the solid Ziegler Natta catalyst component (SC), the external donor and the co-catalyst. Ziegler Natta catalyst system and Ziegler Natta polymerization catalyst are used interchangeable.

DETAILED DESCRIPTION

The composition according to the present invention necessarily includes a nucleating mixture, whereby said nucleating mixture preferably is a mixture of a trisamide or sorbitol derivative soluble nucleating agent and a polymeric particulate nucleating agent. It is even more preferred the trisamide or sorbitol derivative clarifier soluble nucleating agent is 1,3:24-Bis (3,4-dimethylobenzylideno) sorbitol (DMDBS) or 1,3,5-benzene-trisamide. The polymeric nucleating agent preferably is poly(vinylcyclohexane) or poly(vinylcyclopentane). Without wishing to be bound by theory it is believed the nucleating mixture, i.e. the mixture of the soluble nucleating agent and the particulate nucleating agent together with the polymer derived from the specific phthalate free catalyst system together with the external donor results in synergistic nucleation yielding very high melting temperature, high stiffness (reflected by tensile modulus) and simultaneously very reasonable notched impact strength (23° C.), relatively low haze and low shrinkage in FD and TD direction even for polymer compositions having excellent processability (reflected by relative high MFR$_2$).

The composition according to the present invention preferably has an amount of the trisamide or sorbitol derivative clarifier soluble nucleating agent of 500 to 10000 ppm with respect to the total composition. More preferably the amount of the trisamide or sorbitol derivative clarifier soluble nucleating agent is 700 to 4000 ppm, and most preferably 1000 to 2500 ppm with respect to the total composition.

The composition according to the present invention preferably has an amount of the polymeric nucleating agent of 10 to 3000 ppm with respect to the total composition. More preferably the amount of the polymeric nucleating agent is 10 to 500 ppm and most preferably 10 to 40 ppm with respect to the total composition.

It is highly preferred that the polypropylene composition according to the present invention contains a vinylcycloalkane, like vinylcyclohexane (VCH), polymer and/or vinylalkane polymer, as the particulate nucleating agent.

Polyvinylcyclohexane (PVCH) is particularly preferred. The nucleating agent can be introduced as a masterbatch. Ideally such masterbatch is prepared from the inventive composition not containing the particulate nucleating agent. Other carrier polypropylenes may also be possible.

However, it is also possible to introduce the particulate nucleating agent by BNT-technology as described below.

The particulate nucleating agent may be introduced to the inventive polypropylene butylene composition or one of its components during the polymerization process of the polypropylene butylenes composition or one of its components.

It is particularly preferred to add the above defined vinyl compound, preferably vinylcycloalkane in the presence of a catalyst system as described herein. The incorporation of the polymeric nucleating agent to the polypropylene butylenes polymer composition during the polymerization is referred to as BNT-technology as described below. Said obtained reaction mixture is herein below referred interchangeably as modified catalyst system.

The composition according to the present invention preferably is nucleated by BNT technology, i.e. the vinylcyclohexane is introduced during the polymerization process by feeding vinylcyclohexane in amounts such that the amount of polyvinylcyclohexane is 10 to 500 ppm and most preferably 10 to 40 ppm with respect to the total composition.

It is essential for the inventive compositions that the comprised propylene butylenes copolymers or the propylene butylene ethylene terpolymers do not contain phthalic acid esters as well as decomposition products thereof. As defined above "Free of phthalic acid esters as well as decomposition products thereof" indicates a maximum of 10 μg/kg, i.e. 10 ppb by weight. This is guaranteed by the use of a Ziegler Natta catalyst not having a phthalate internal donor for the preparation. In other words, the catalyst used in the present invention is a Ziegler-Natta catalyst comprising a specific solid catalyst component (SC) free of phthalic acid esters or derivates thereof. Said solid catalyst component and preparation thereof is described below in the process section. Said solid catalyst component (SC) is free of any external support material and comprises (a) a compound of a transition metal selected from one of the groups 4 to 6, in particular of group 4 of the periodic table (IUPAC), preferably Ti, (b) a compound of a metal selected from one of the groups 1 to 3 of the periodic table (IUPAC), preferably of group 2 of the periodic table (IUPAC), in particular Mg, (c) a non-phthalic internal electron donor (ID).

The solid catalyst component can optionally contain an aluminium compound (d). The solid catalyst component does not contain any phthalic compounds.

It is further particularly preferred that the propylene butylenes polymer composition is free of phthalic acid esters as well as decomposition products thereof, i.e. the composition as a whole meets the maximum of 10 µg/kg, i.e. 10 ppb by weight. In other words any further component being within the scope of the claims due to the comprising wording also has to meet the criteria as set forth above.

The propylene polymer composition according to the present invention has a melt flow rate MFR2 (2.16 kg load, 230° C.) measured according to ISO 1133, in the range of 12 to 50 g/10 min, preferably in the range of 14 to 40 g/10 min, more preferably in the range of 15 to 35 g/10 min, especially in the range of 16 to 30 g/10 min.

The propylene polymer composition according to the present invention has a tensile modulus (measured on injection molded test specimens in accordance with ISO 527 of more than 1200 MPa, preferably more than 1250 MPa, more preferably more than 1300 MPa and most preferably more than 1350 MPa. If the propylene polymer composition according to the present invention is a propylene butylene copolymer composition, i.e. no ethylene is present, it is preferred the tensile modulus (measured on injection molded test specimens in accordance with ISO 527 is more than 1300 MPa, preferably more than 1400 MPa, more preferably more than 1450 MPa and most preferably more than 1500 MPa.

The melting temperature (Tm) measured according to ISO 11357-3 of the propylene polymer composition according to the present invention is at least 150° C., preferably at least 151° C. and more preferably at least 152° C. If the propylene polymer composition according to the present invention is a propylene butylene copolymer composition, i.e. no ethylene is present, melting temperature (Tm) measured according to ISO 11357-3 is preferably at least 152° C., more preferably at least 153° C. and most preferably at least 154° C.

The xylene soluble fraction (XCS) of the propylene polymer composition according to the present invention is less than 7.0 wt.-%. Preferably the xylene soluble fraction (XCS) of the propylene polymer composition according to the present invention ranges from 2.0 wt.-% to less 6.5 wt.-%. If the propylene polymer composition according to the present invention is a propylene butylene copolymer composition, i.e. no ethylene is present, xylene soluble fraction (XCS) preferably will be from 2.0 wt.-% to 4.0 wt. % and more preferably from 2.2 to 4.0 wt.-%. If the propylene polymer composition according to the present invention is a propylene butylene ethylene terpolymer composition the xylene soluble fraction (XCS) preferably will be from 4.0 wt.-% to 6.8 wt. % and more preferably from 4.5 to 6.7 wt.-%

The composition according to the present invention preferably has a content of hexane hot solubles C6 (FDA) of less than 2.5 wt.-%, more preferably less than 2.0 wt. % and most preferably less than 1.9 wt.-%. If the polymer is a propylene butylene copolymer the content of hexane hot solubles C6 (FDA) most preferably is less than 1.6 wt.-%.

Moreover, in a preferred embodiment of the inventive composition, if the polymer is a propylene butylene copolymer, the tensile modulus of the composition (measured on injection moulded test specimens in accordance with ISO 527) is more than 1400 MPa, the melting temperature Tm of the composition is at least 152° C. and the C6 content [C6 (FDA)] of the composition is below 1.8 wt.-%. More preferably this embodiment has an amount of xylene cold soluble (XCS) fraction of 2.0 to 4.0 wt.-%. wt.-% with respect to the composition.

Alternatively, in an also preferred embodiment, if the polymer is a propylene butylene ethylene terpolymer, the tensile modulus of the composition (measured on injection moulded test specimens in accordance with ISO 527) is more than 1300 MPa, the melting temperature Tm of the composition is at least 151° C. and the C6 content [C6 (FDA)] of the composition is below 2.0 wt.-%. More preferably this embodiment has an amount of xylene cold soluble (XCS) fraction of 4.0 to 6.8 wt.-% with respect to the composition.

The composition according to the present invention preferably has a crystallisation temperature Tc of more than 118° C., more preferably of more than 119° C. and most preferably more than 120° C.

The Notched Impact Strength NIS (23° C.) of the present propylene butylene polymer (i.e. the propylene butylenes copolymer or the propylene butylenes ethylene terpolymer) can be at least 3.0 kJ/m$^2$ or above, is preferably above 4.0 kJ/m$^2$; more preferably above 5.0 kJ/m$^2$, most preferably above 5.5 kJ/m$^2$ when measured according to IS0179/1 eA at +23° C. A reasonable upper limit for the NIS is 20 kJ/m$^2$.

Haze of the inventive propylene-butylene polymer of the present invention (i.e. the propylene butylenes copolymer or the propylene butylenes ethylene terpolymer) can be 23.0% or below when measured on 1 mm plaques, such as 22.0%, or 21.0% or below.

In a further aspect the present invention is concerned with a process for the preparation of a propylene butylene copolymer composition
whereby the propylene butylene copolymer is
free of phthalic acid esters as well as decomposition products thereof; and
is obtained by a Ziegler-Natta catalyst
and the composition comprises a mixture of at least one particulate and at least one soluble nucleating agent,
whereby the propylene butylene copolymer composition has a MFR (2.16 kg/210° C.) in the range of 12 to 50 g/10 min
a tensile modulus (measured on injection moulded test specimens in accordance with ISO 527) of more than 1200 MPa
a Tm of more than 150° C.
an amount of xylene cold soluble (XCS) fraction of less than 7.0 wt.-%
and whereby the propylene butylene copolymer includes monomer units derived from
a) propylene in an amount of 91-96 wt.-%
b) butylene in an amount of 4-9 wt.-%
with respect to the total weight of the propylene butylene copolymer, the process comprising:
polymerizing propylene and butylene in a two reactors coupled in series
using a Ziegler Natta catalyst system having citraconate as internal donor, an organoaluminium compound, preferably tetraethyl aluminium (TEAL), as co-catalyst), and an organosilane, preferably dicyclopentyldimethoxysilane (donor D) as external donor at a Al/external donor ratio of 5.0-8.0 mol/mol and a Al/Ti ratio of 190 to 240 mol/mol, and further feeding a particulate nucleating agent to at least one reactor,
whereby in a first reactor a pre-polymerization is carried out at 25-35° C. for 10 to 60 minutes yielding a pre-polymer, further polymerizing the pre-polymer at a temperature of 65-75° C., at a C4/C3 ratio of 115 to 145 mol/kmol yielding a first intermediate having an C4 content of 4 to 7 wt.-% and XCS of 2 to 5 wt.-%,
transferring the first intermediate to a second reactor and further polymerizing at 75 to 85° C. at a C4/C3 ratio of 90 to 130 mol/kmol,
to yield the second reactor product,
extruding the second reactor product in the presence of a soluble nucleating agent.

All preferred features as discussed above with respect to the composition and/or the polymer shall also apply to the product of this process.

In yet a further aspect the present invention is concerned with a process for the preparation of a propylene butylene ethylene terpolymer composition including a propylene butylene ethylene terpolymer which is
free of phthalic acid esters as well as decomposition products thereof; and
is obtained by a Ziegler-Natta catalyst and includes a mixture of at least one particulate and at least one soluble nucleating agent,
and wherein the propylene butylene ethylene terpolymer includes monomer units derived from
a) propylene in an amount of 90-96 wt.-%
b) butylene in an amount of 4-9 wt.-%
c) ethylene in an amount of not more than 1.0 wt.-%
with respect to the total weight of the propylene butylene ethylene terpolymer.
the process comprising
polymerizing propylene, butylenes and ethylene in a three reactors coupled in series
using a Ziegler Natta catalyst system
having citraconate as internal donor and an organosilane, preferably dicyclopentyldimethoxysilane (donor D) as external donor at a Al/external donor ratio of 5.0-8.0 mol/mol and a Al/Ti ratio of 190 to 240 mol/mol, and further feeding a particulate nucleating agent to at least one reactor, whereby in a first reactor a pre-polymerization is carried out at 25-35° C. for 10 to 60 minutes yielding a pre-polymer, further polymerizing the pre-polymer at a temperature of 65-75° C., at a C4/C3 ratio of 115 to 145 mol/kmol yielding a first intermediate having an C4 content of 4 to 7 wt.-% and XCS of 2 to 5 wt.-%,
transferring the first intermediate to a second reactor and further polymerizing at 75 to 85° C. at a C4/C3 ratio of 80 to 120 mol/kmol to yield the second reactor product,
transferring the second reactor product to a third reactor and further polymerizing at a temperature of 75 to 85° C. at a C2/C3 ratio of 70 to 90 mol/kmol to yield a third reactor product, and
extruding the third reactor product in the presence of a soluble nucleating agent to yield the final composition.

The propylene polymer compositions according to the present invention are produced in a sequential polymerization process. The term "sequential polymerization process" indicates that the propylene polymer composition is produced in at least two reactors connected in series. In one preferred embodiment the term "sequential polymerization process" indicates in the present application that the polymer of the first reactor (R-1), i.e. the propylene homo-, co- or terpolymer fraction (A), is directly conveyed with unreacted monomers to the second reactor (R-2) in which the propylene terpolymer fraction (B) is produced.

Accordingly, a decisive aspect of the present process is the preparation of the propylene polymer composition in at least two separate reactors, wherein the reaction mixture of the first reactor (R-I) is conveyed, preferably directly conveyed, to the second reactor (R-2), and thus the propylene polymer compositions comprise two fractions, namely fractions (A) and (B). Accordingly, the present process comprises at least a first reactor (R-1) and a second reactor (R-2).

The process may preferably comprise at least one additional polymerization reactor (R-3) subsequent to reactor (R-2).

The term "polymerization reactor" indicates a reactor, where the main polymerization takes place. Thus in case the process consists of two or more polymerization reactors, this definition does not exclude the option that the overall process comprises for instance a pre-polymerization step in a pre-polymerization reactor. The term "consists of is only a closing formulation in view of the main polymerization reactors. In case the process configuration comprises a pre-polymerization reactor, fraction (A) means the sum of (co)polymers produced in the pre-polymerization reactor and in the first polymerization reactor (R-1).

The polymerization reactors are selected from slurry and gas phase reactors.

The first reactor (R-1) is preferably a slurry reactor (SR) and can be any continuous or simple stirred batch tank reactor or a loop reactor operating in bulk or slurry. By "bulk polymerization" is meant a process, where the polymerization is conducted in a liquid monomer essentially in the absence of an inert diluent. However, as it is known to a person skilled in the art, the monomers used in commercial production may contain aliphatic hydrocarbons as impurities. For instance, the propylene monomer may contain up to 5% of propane as an impurity. Thus, preferably polymerization in bulk means polymerization in a reaction medium that comprises of at least 60% (wt/wt) of the monomer. According to the present invention the slurry reactor (SR) is preferably a (bulk) loop reactor (LR). The second reactor (R-2) is preferably a gas phase reactor (GPR). Such gas phase reactor (GPR) can be any mechanically mixed or fluidized bed reactor or settled bed reactor. The third reactor (R-3) is preferably a gas phase reactor (GPR). Again such gas phase reactor (GPR) can be any mechanically mixed or fluidized bed reactor or settled bed reactor.

Preferably the gas phase reactor (GPR) comprises a mechanically agitated fluidized bed reactor with gas velocities of at least 0.2 m/sec. The gas phase reactor of a fluidized bed type reactor can further include a mechanical agitator to facilitate the mixing within the fluidized bed.

A preferred multistage process is a "loop-gas phase"-process, such as developed by Borealis (known as BORSTAR® technology) described e.g. in patent literature, such as in WO-A-98/58976, EP-A-887380 and WO-A-98/58977.

Preferably in the first reactor (R-1), preferably in the slurry reactor (SR), like in the loop reactor (LR), the temperature is equal or more than 65° C., preferably in the range of equal or more than 67° C. to equal or below 75° C., still more preferably in the range of equal or more than 67° C. to equal or below 74° C.

The pressure in the first reactor (R-1), preferably in the slurry reactor (SR), like in the loop reactor (LR), is not a critical issue, however, is typically within the range of 4000 to 6500 kPa.

Hydrogen can be added into the reactor for controlling the molar mass in a manner known per se.

Subsequently, the reaction mixture from the first reactor (R-1) is transferred to the second reactor (R-2), i.e. to the gas phase reactor (GPR-1), whereby the temperature in the second reactor (R2) is preferably within the range of equal or more than 75° C. to equal or below 85° C., more preferably of equal or more than 77° C. to equal or below 82° C.

Further it is preferred that in the second reactor (R-2), preferably in the gas phase reactor (GPR-1), the pressure is within the range of 2000 to 4000 kPa. Hydrogen can be added for controlling the molar mass in a manner known per se.

The residence time can vary in both reactor zones.

If a third reactor (R-3) is used, preferably a second gas phase reactor, (GPR-2) the preferred temperature and preferred pressures ranges are the same as given above for the second reactor (R-2), particularly the first gas phase reactor (GPR-1).

In one embodiment of the process for producing propylene polymer compositions of the present invention the residence time in the bulk reactor, e.g. loop reactor, is in the range 0.2 to 2 hours, preferably 0.3 to 1.0 hour and the residence time in gas phase reactor (GPR-1) will generally be 0.75 to 3.0 hours, preferably 1.0 to 2.0 hours more preferably 1.25 to 2.0 hours.

In a second preferred embodiment including the use of three reactors coupled in series, it is preferred that the polymerization in the further gas phase reactor, preferably the second gas phase reactor (GPR-2) is operated at a residence time of 1 minute to 45 minutes, preferably 1 to 10 minutes.

The present process preferably encompasses a pre-polymerization (Pr) prior to the polymerization in the first reactor (R-1). The pre-polymerization (Pr) can be conducted in the first reactor (R-1), however it is often preferred in commercial processes that the pre-polymerization (Pr) takes place in a separate reactor, so called pre-polymerization reactor (Pr-R). A pre-polymerization reactor is of smaller size compared to the first (R-1) and second (R-2) reactor, respectively. The reaction volume of the pre-polymerization reactor (Pr-R) can be e.g. between 5% and 40% of the reaction volume of the first reactor (R-1), like the loop reactor. In said pre-polymerization reactor (Pr-R), the pre-polymerization (Pr) is performed in bulk or slurry as defined for the first reactor (R-1) above.

Further it is appreciated that the pre-polymerization temperature is rather low, i.e. equal or below 40° C., more preferably between equal or more than 10° C. to equal or below 40° C., yet more preferably between 15 to 40° C., most preferably between 20 to 35° C.

Residence times for prepolymerization can vary between 0.1 to 1.0 hours, like between 0.2 and 0.6 hours, typically 15 to 30 minutes.

The amount of polymer material made in the first reactor, preferably the loop reactor, preferably is 45 to 70 wt.-% including also the minor amount of polymer material made in pre.polymerization. More preferably the amount is 45 to 65 wt.-%. If only two reactor are used (pre-polymerization is not considered insofar), the amount preferably will be in the upper end, i.e. preferably will be 55 to 65 wt.-%. If three reactors are used the amount preferably will be 45 to 55 wt.-%. As known in the art the amount of material is also referred to as split.

The amount of polymer material made in the second reactor, preferably the first gas phase reactor, preferably is 30 to 55 wt.-%. If only two reactor are used (pre-polymerization is not considered insofar), the amount preferably will be 45 to 55 wt.-%. If three reactors are used the amount preferably will be 45 to 55 wt.-%.

The amount of polymer material made in the third reactor, preferably the second gas phase reactor, preferably is less than 10 wt.-%, more preferably less than 7 wt.-% and most preferably less than 6 wt.-%.

According to the process of the invention butylene comonomer and ethylene can be fed independently into the polymerization process i) into the first reactor (R-1) only, whereby any unreacted comonomers can be, preferably are, transferred to the second reactor together with the propylene polymer fraction produced in R-1 (A), or ii) comonomers are fed into the first reactor (R-1) and in addition to the unreacted comonomers from the first reactor additional comonomer is fed into the second reactor (R-2), or iii) no comonomers are fed into the first reactor (R-1), but are fed only into the second reactor (R-2).

Variant ii) is preferred.

Feeding butylenes and ethylene comonomer independently into the polymerization process means that it is possible that both are fed to the same reactor(s) or are fed into different reactors.

When a terpolymer is produced it is preferred that butylene (as the comonomer) is fed in one or two reactors, whereas ethylene is fed (as the comonomer) in one reactor only.

It is preferred to purge the polymer after the polymerization to reduce the amount of residual hydrocarbons in the polymer. Typically the purging step is conducted in a purge vessel where the polymer is contacted with a purge gas, conventionally nitrogen. The temperature during the purging step is from 30 to 110° C., preferably from 30 to 95° C. and more preferably from 40 to 80° C. The average residence time is from 5 to 240 minutes, preferably from 10 to 200 minutes. Catalyst residues are deactivated with steam or moisturized air.

Preferably the purging step is conducted continuously. In a preferred embodiment the polymer particles are introduced to the top of the purge vessel and removed from the bottom. Thereby a downward flow of polymer particles is established. The purge gas is typically introduced at the bottom of the purge vessel so as to achieve a counter-current flow of particles and gas. The gas flow is selected so that no fluidization of the polymer particles occurs in the purge vessel. Thereby a narrow residence time distribution of the polymer particles is obtained and the process has a good efficiency.

The catalyst used in the present invention is a Ziegler-Natta catalyst comprising a specific solid catalyst component free of phthalic acid esters or derivates thereof as briefly outlined above. The solid catalyst component and preparation thereof is described below. As indicated above, one further important aspect of the present invention is that a specific solid catalyst component has to be used in the instant polymerization process.

Said solid catalyst component (SC) is free of any external support material and comprises (a) a compound of a transition metal selected from one of the groups 4 to 6, in particular of group 4 of the periodic table (IUPAC), preferably Ti, (b) a compound of a metal selected from one of the groups 1 to 3 of the periodic table (IUPAC), preferably of group 2 of the periodic table (IUPAC), in particular Mg, (c) a non-phthalic internal electron donor (ID). The solid catalyst component can optionally contain an aluminium compound (d). The solid catalyst component does not contain any phthalic compounds.

In addition to the solid catalyst component (SC) the polymerization catalyst comprises cocatalyst(s), like an organo aluminium compound and external electron donor (s), like an organo silane compounds as is well known in the art and will be described in more detail later. These components are not part of the solid catalyst component as defined above, but are fed separately to the polymerization process.

A remarkable feature of the used catalyst component (SC) is that it is of solid form. In other words for the propylene polymer composition (P) polymerization an heterogeneous catalysis is applied, i.e. the aggregate state (solid state) of the catalyst component (SC) differs from the aggregate state of the reactants, i.e. the propylene, ethylene and other a-olefins used.

Different to traditional known solid catalysts, the catalyst component (SC) used in the present invention is a so-called self-supported catalyst system, or in other words in the solid catalyst component (SC) active catalyst components are not supported on any external support or carrier material. Thus, the solid catalyst component used in the present invention does not comprise in any significant amounts of catalytically inert material which is normally used as support material. Inert support material is understood to be in this application any material which is used to decrease solubility of the catalyst systems in polymerizations media as well in common solvents like pentane, heptane and toluene.

Typical inert support materials used in typical prior art supported catalysts are organic and inorganic support materials, like silica or porous polymeric material. These support materials are generally used in amounts of at least 50 wt.-%, more preferably of at least 70 wt.-% in prior art catalysts. However, the solid catalyst component (SC) used in the present invention, is prepared without using any external support material and thus the amount of such an inert support material within the solid catalyst component (SC) is of not more than 10.0 wt.-%, yet more preferably below 5.0 wt.-%, yet more preferably not detectable.

Typically the solid catalyst component (SC) is in a form of solid particles having a surface area, measured according to the commonly known BET method with N2 gas as analysis adsorptive (ASTM D 3663), less than 20 m$^2$/g. In some embodiments the surface area is preferably less than 15 m$^2$/g, more preferably is less than 10 m$^2$/g. In some other embodiments, the solid catalyst particles show a surface area 5 m$^2$/g or less, which is the lowest detection limit with the methods used in the present invention.

The solid catalyst particles can be additionally or alternatively defined by the pore volume measured according to ASTM 4641. Thus it is appreciated that the solid catalyst particles are of a pore volume of less than 1.0 ml/g. In some embodiments the pore volume is more preferably of less than 0.5 ml/g, still more preferably of less than 0.3 ml/g and even less than 0.2 ml/g. In another preferred embodiment the pore volume is not detectable when determined according to ASTM 4641.

Moreover the solid catalyst particles are typically of a mean particle size of not more than 500 μm, i.e. preferably in the range of 2 to 500 μm, more preferably 5 to 200 μm. It is in particular preferred that the mean particle size is below 150 μm, still more preferably below 100 μm. A preferred range for the mean particle size is 10 to 80 μm. In some embodiments mean particle size is preferably in the range of 10 to 60 μm.

As indicated above the solid catalyst component (SC) used in the present invention is most preferably in the form of spherical, compact particles having smooth surface. Further, particle size distribution is in a preferred embodiment narrow.

A further essential feature of the catalyst used in the present invention is that the catalyst is prepared without any phthalic compounds typically used as internal electron donor or donor precursor. In the present invention expressions "internal electron donor" and "internal donor" have the same meaning and can be used interchangeable.

Thus, the solid catalyst component used in the present invention is a solid Ziegler-Natta catalyst component, which comprises a compound of a transition metal of Group 4 to 6, most preferably a titanium compound, a Group 1 to 3 metal compound, most preferably a magnesium compound and an internal electron donor (ID) being a non-phthalic compound. Thus, the catalyst is prepared without any undesired phthalic compounds, and thus the catalyst is featured to be a "non-phthalic catalyst component". Further, the solid catalyst is free of any external support material, like silica or MgCb, but the catalyst is self-supported.

The solid catalyst component in particulate form is obtainable by the following general procedure:
a) providing a solution of
 a1) at least a Group 2 metal alkoxy compound (Ax) being the reaction product of a Group 2 metal compound and an alcohol (A) comprising in addition to the hydroxyl moiety at least one ether moiety optionally in an organic liquid reaction medium; or
 a.2) at least a Group 2 metal alkoxy compound (Aχ') being the reaction product of a Group 2 metal compound and an alcohol mixture of the alcohol (A) and a monohydric alcohol (B) of formula ROH, where R is an alkyl of 2 to 16 C-atoms, optionally in an organic liquid reaction medium; or
 a3) a mixture of the Group 2 metal alkoxy compound (Ax) and a Group 2 metal alkoxy compound (Bx) being the reaction product of a Group 2 metal compound and the monohydric alcohol (B), optionally in an organic liquid reaction medium; or
 a.4) Group 2 metal alkoxy compound of formula M(ORi)n(OR2)mX2-n-m or mixture of Group 2 alkoxides M(ORi)n'X2-n' and M(OR2)m'X2-m', where M is Group 2 metal, X is halogen, Ri and R2 are different alkyl groups of C2 to Cie carbon atoms, and 0<n<2, 0<m<2 and n+m<_2, provided that both n and m are not simultaneously zero, 0<n'<2 and 0<m'<2; and
b) adding said solution from step a) to at least one compound of a transition metal of Group 4 to 6 and
c) obtaining the solid catalyst component particles, and adding a non-phthalic internal electron donor (ID) at any step prior to step c).

The internal donor (ID) or precursor thereof can thus added to the solution of step a) or to the transition metal compound before adding the solution of step a) into said transition metal compound, or after the addition of the solution of step a) into the transition metal compound. According to the procedure above the solid catalyst can be obtained via precipitation method or via emulsion-solidification method depending on the physical conditions, especially temperature used in steps b) and c). Emulsion is also called liquid/liquid two-phase system.

In both methods (precipitation or emulsion-solidification) the catalyst chemistry is the same.

In the precipitation method combination of the solution of step a) with at least one transition metal compound in step b) is carried out and the whole reaction mixture is kept at least at 50° C., more preferably in the temperature range of 55 to 110° C., more preferably in the range of 70 to 100° C., to secure full precipitation of the catalyst component in the form of a solid particles (step c).

In the emulsion-solidification method in step b) the solution of step a) is typically added to the at least one transition metal compound at a lower temperature, such as in the range of −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step c) of the droplets is suitably carried out by heating the emulsion to a temperature of 70 to 150° C., preferably to 80 to 110° C.

The catalyst prepared by emulsion-solidification method is preferably used in the present invention. Preferably the Group 2 metal is magnesium.

The Group 2 metal, preferably magnesium alkoxy compounds (Ax), (Ax') and (Bx) can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds (¾)) and used as such in the catalyst preparation process of the invention. In a preferred embodiment in step a) the solution of ai) or as) are used, i.e. a solution of (Ax') or a solution of a mixture of (Ax) and (Bx).

Illustrative examples of alcohols (A) are glycol monoethers. Preferred alcohols (A) are C2 to C4 glycol monoethers, wherein the ether moieties comprise from 2 to 18 carbon atoms, preferably from 4 to 12 carbon atoms. Preferred examples are 2-(2-ethylhexyloxy)ethanol, 2-butyloxy ethanol, 2-hexyloxy ethanol, 1,3-propylene-glycol-monobutyl ether and 3-butoxy-2-propanol, with 2-(2-ethylhexyloxy) ethanol, 1,3-propylene-glycol-monobutyl ether and 3-butoxy-2-propanol being particularly preferred. Illustrative monohydric alcohols (B) are of formula ROH, with R being straight-chain or branched C2-C16 alkyl residue, preferably C4 to 010, more preferably Ceto Cs alkyl residue The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 10:1 to 1:10, more preferably 6:1 to 1:6, still more preferably 5:1 to 1:3, most preferably 5:1 to 3:1.

Magnesium alkoxy compound may be a reaction product of alcohol(s), as defined above, and a magnesium compound selected from dialkyl magnesiums, alkyl magnesium alkoxides, magnesium dialkoxides, alkoxy magnesium halides and alkyl magnesium halides. Further, magnesium dialkoxides, magnesium diaryloxides, magnesium aryloxyhalides, magnesium aryloxides and magnesium alkyl aryloxides can be used. Alkyl groups can be similar or different C1-C20 alkyls, preferably C2-C10 alkyl. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred dialkyl magnesiums are butyl octyl magnesium or butyl ethyl magnesium.

It is also possible that magnesium compound can react in addition to the alcohol (A) and alcohol (B) also with a polyhydric alcohol (C) of formula R" (OH)mto obtain said magnesium alkoxide compounds. Preferred polyhydric alcohols, if used, are alcohols, wherein R" is a straight-chain, cyclic or branched C2 to C10 hydrocarbon residue, and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides. In addition a mixture of magnesium dihalide and a magnesium dialkoxide can be used.

The solvents to be employed for the preparation of the present catalyst may be selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylol, pentane, hexane, heptane, octane and nonane. Heptane and pentane are particular preferred. The reaction for the preparation of the magnesium alkoxy compound may be carried out at a temperature of 0° C. to 80° C., suitable at a temperature of 20° C. to 70° C. Most suitable temperature is selected depending on the Mg compound and alcohol(s) used.

The transition metal compound of Group 4 to 6 is preferably a titanium compound, most preferably a titanium halide, like $TiCl_4$. The internal donor (ID) used in the preparation of the catalyst used in the present invention is preferably selected from (di)esters of non-phthalic carboxylic (di)acids, 1,3-diethers, and derivatives thereof. Especially preferred internal donors are (di)esters of (di)carboxylic acids, in particular esters belonging to a group comprising malonates, maleates, substituted maleates, like citraconates, succinates, glutarates, cyclohexene-1,2-dicarboxylates and benzoates, and any derivatives thereof. Preferred examples are substituted maleates, like 2-methyl maleates.

Most preferably the internal donor (ID) is di-2-ethylhexyl citraconate.

In emulsion method, the two phase liquid-liquid system may be formed by simple stirring and optionally adding (further) solvent(s) and additives, such as the turbulence minimizing agent (TMA) and/or the emulsifying agents and/or emulsion stabilizers, like surfactants, which are used in a manner known in the art for facilitating the formation of and/or stabilize the emulsion. Preferably, surfactants are acrylic or methacrylic polymers. Particular preferred are unbranched C12 to C20 (meth)acrylates such as poly(hexadecyl)-methacrylate and poly(octadecyl)-methacrylate and mixtures thereof. Turbulence minimizing agent (TMA), if used, is preferably selected from a-olefin polymers of a-olefin monomers with 6 to 20 carbon atoms, like polyoctene, polynonene, polydecene, polyundecene or polydodecene or mixtures thereof. Most preferable it is polydecene.

The solid particulate product obtained by the precipitation or by the emulsion-solidification method may be washed at least once, preferably at least twice, most preferably at least three times with aromatic and/or aliphatic hydrocarbons, preferably with toluene, heptane or pentane and/or with TiCl4. Washing solutions can also contain donors and/or compounds of Group 13, like trialkyl aluminium, halogenated alkyl aluminium compounds or alkoxy aluminum compounds. Aluminium compounds can also be added during the catalyst synthesis.

The catalyst can further be dried, as by evaporation or flushing with nitrogen, or it can be slurried to an oily liquid without any drying step.

The finally obtained solid catalyst component is desirably in the form of particles having generally an average particle size range of 5 to 200 µm, preferably 10 to 100 µm. Particles are compact with low porosity and have surface area below 20 g/m², more preferably below 10 g/m², or even below 5 g/m², i.e. below the detection limit. Typically the amount of Ti is 1-6 wt-%, Mg 10 to 20 wt-% and internal donor 10 to 40 wt-% in the solid catalyst component.

Detailed description of the preparation of catalysts used in the present invention are disclosed in WO 2012/007430, EP2610271, EP 261027 and EP2610272 which are incorporated here by reference.

As a further catalyst component in the instant polymerization process an external electron donor (ED) being an organosilane is present. In the present invention expressions "external electron donor" and "external donor" have the same meaning and can be used interchangeable.

Preferably the external donors used in the present invention are selected from cyclohexylmethyl dimethoxy silane (C-Donor) or dicyclopentyl dimethoxy silane (D-Donor), the latter being especially preferred. In addition to the solid catalyst component and the optional external donor (ED) a co-catalyst is used.

The co-catalyst is a compound of group 13 metal of the periodic table (IUPAC), such as an organoaluminum compound, like aluminum alkyl, or aluminum alkyl halide compound. Accordingly in one specific embodiment the co-catalyst (Co) is preferably a trialkylaluminium, like (C1-C6) trialkyl aluminium, especially triethylaluminium (TEAL), dialkyl aluminium halide, like (C1-C6) dialkyl aluminium chloride, especially diethyl aluminium chloride or alkyl aluminium dihalide, like (C1-C6) alkyl aluminium dichloride, especially ethyl aluminium dichloride or mixtures thereof. In one specific embodiment the co-catalyst (Co) is triethyl aluminium (TEAL).

The molar ratio between the co-catalyst (Co) and the external donor (ED) [Co/ED] and/or the ratio between the co-catalyst (Co) and the transition metal (TM) [Co/TM] should be carefully chosen for each process.

According to the present invention the Al/external donor ratio [Al/ED] is in the range of 5.0 to 8.0 (mol/mol), more preferably 6.0 to 7.5 (mol/mol) and most preferably 6.3 to 7.2 (mol/mol).

In a further aspect, the Aluminum/Titanium ratio is 190 to 240 (mol/mol). If a propylene butylene copolymer composition is prepared the Aluminum/Titanium ratio preferably is 210 to 240 (mol/mol), more preferably 220 to 240 (mol/mol), and most preferably 225 to 240 (mol/mol).

If a propylene butylene ethylene terpolymer composition is prepared the Aluminum/Titanium ratio preferably is 190 to 225 (mol/mol), more preferably 190 to 220 (mol/mol), and most preferably 190 to 210 (mol/mol).

As used herein the term "moulded article" is intended to encompass articles that are produced by any conventional moulding technique, e.g. injection moulding, stretch moulding, compression moulding, rotomoulding or injection stretch blow moulding. The term is not intended to encompass articles that are produced by casting or extrusion, such as extrusion blow moulding. Thus the term is not intended to include films or sheets.

Articles produced by injection moulding, stretch moulding, or injection stretch blow moulding are preferred. Articles produced by injection moulding are especially preferred.

The articles preferably are thin-walled articles having a wall thickness of 300 micrometer to 2 mm. More preferably the thin-walled articles have a wall thickness of 300 micrometer to 1400 micrometer, and even more preferably the thin-walled articles have a wall thickness of 300 micrometer to 900 micrometer.

The articles of the current invention can be containers, such as cups, buckets, beakers, trays or parts of such articles, such as see-through-windows, lids, or the like.

The articles of the current invention are especially suitable for containing food, especially frozen food, such as ice-cream, frozen liquids, sauces, pre-cooked convenience products, and the like.

Articles of the current invention are also suitable for medical or diagnostic purposes, such as syringes, beaker, pipettes, etc.

It is however envisaged in the present invention, that the articles made of the inventive compositions may comprise further ingredients, such as additives (stabilizers, lubricants, colorants) or polymeric modifiers. It is particularly preferred the amount of polymeric modifiers is limited to 5 wt.-% of the total material.

Particularly the injection molded article according to the present invention is preferably characterized by the composition having a haze (1 mm plaque) of less than 23%.

Preferably the injection molded article according to the present invention is preferably characterized by FD shrinkage of less than 1.38% and further preferably by a TD shrinkage of less than 1.55.

Further preferably the injection molded article according to the present invention is characterized by the composition having a NIS (23° C.) of at least 5.0 kJ/m².

The present invention will now be described in further detail by the examples provided below:

EXAMPLES

Measurement Methods

MFR2 (230° C.) is measured according to ISO 1133 (230° C., 2.16 kg load).

Phthalic Acid Esters and Decomposition Products

Detection is carried out by gas chromatography coupled with one- or two-dimensional mass spectrometry (GC-MS respectively GC-MS/MS) optionally preceded by enrichment on a suitable adsorption material.

"Free of phthalic acid esters as well as decomposition products thereof" indicates a maximum of 10 µg/kg, i.e. 10 ppb by weight.

Typical equipment to be used is for example given in H. Fromme, T. Küchler, T. Otto, K. Pilz, J. Müller, A. Wenzel Water Research 36 (2002) 1429-1438 which is incorporated by reference herewith.

Comonomer Content by IR Spectroscopy

Ethylene content in propylene polymer is measured by Fourier-transform infrared (FTIR) spectroscopy. A thin film of the sample (thickness approximately 0.3 mm) prepared by hot-pressing. The area of —CH2- absorption peak 720+730 cm-1 is measured using baseline 762-694 cm-1. The area of reference peak at 4323 cm-1 is measured using baseline 4650-4007 cm-1. The method is calibrated by ethylene content data measured by 13C NMR.

The calibration procedure should be undertaken within the vendor software using a quadratic function:

$$W_E = C_2 \times A_0^2 + C_1 \times A_0 + C_0$$

where $W_E$ is the ethylene content of the copolymer in units of weight percent;

$A_0$ is the area of the quantitative band normalised to that of the reference band;

$C_2$ is the quadratic calibration coefficient (curvature);

$C_1$ is the linear calibration coefficient (slope);
$C_0$ is the offset calibration coefficient (offset).

Content of 1-butene Comonomer

The 1-butene content in propylene polymer is measured by using FTIR according to the following procedure. A thin film of the sample (thickness approximately 0.45 mm) is prepared by hot-pressing. The butene content is determined measuring the area of peak 767 cm-1 and using the baseline between 780 and 750 cm-1. The height of reference peak at 4323 cm-1 is measured between 4323 and 4700 cm-1. The method is calibrated by butene content data measured by 13C NMR.

The 1-butene content is calculated as following equation $$\text{Butene}(w - \%) = B * \frac{\text{Area(butene peak 767 cm} - 1)}{\text{abs4323(cm} - 1) - \text{abs4700(cm} - 1)} + C$$

B is the linear calibration coefficient (slope)
C is the offset calibration coefficient (offset)

Melting and Crystallisation Temperature

The melting and crystallisation temperature Tm and TC are determined according to ISO 11357-1, -2 and -3 with a TA-Instruments 2920 Dual-Cell with RSC refrigeration apparatus and data station. A heating and cooling rate of 10° C./min is applied in a heat/cool/heat cycle between +23 and +210° C., the crystallisation temperature TC being determined in the cooling step and the Tm melting temperature being determined in the second heating step.

Xylene Cold Soluble fraction at room temperature (XCS, wt.-%) is determined at 25° C. according to ISO 16152; 5th edition; 2005 Jul. 1.

C6 (FDA)

Hexane solubles (wt.-%): determined in accordance with FDA section 177.1520 1 g of a polymer cast film of 100 pin thickness (produced on a PM30 cast film line using chill-roll temperature of 40° C.) is extracted by 400 ml hexane at 50° C. for 2 hours while stirring with a reflux cooler. After 2 hours the mixture is immediately filtered on a filter paper N°41. The precipitate is collected in an aluminium recipient and the residual hexane is evaporated on a steam bath under N2 flow. The precipitate was weighted again and hexane solubles were calculated.

Notched Impact Strength

The Charpy notched impact strength (NIS) is measured according to ISO 1791 eA at +23° C., using injection molded bar test specimens of $80 \times 10 \times 4$ mm$^3$ prepared in accordance with EN ISO 1873-2.

Haze

Haze is determined according to ASTM D1003-00 on $60 \times 60 \times 1$ mm$^3$ plaques injection molded in line with EN ISO 1873-2

Tensile Modulus

The tensile strength, including tensile stress at yield, strain at yield and elongation at break, is measured according to ISO 527-1 (cross head speed 50 mm/min). The tensile modulus is measured according to ISO 527-1 (cross head speed 1 mm/min) using injection molded specimens according to ISO 527-2 (1B), produced according to EN ISO 1873-2 (dog bone shape, 4 mm thickness).

Shrinkage FD and TD

The shrinkage is determined by injection moulding of the resin with an injection moulding machine into a mould having a cavity to form a plate of $150 \times 80 \times 2$ mm3 in line with ISO 1873-2. After cooling at room temperature for 96 hours, the length and the width of the plate are determined to calculate the longitudinal (flow direction, FD) and the transversal (TD) shrinkage in percent.

Catalyst Properties (Surface Area, Pore Volume, Mean Particle Size)

Surface area is determined as BET with N2 gas ASTM D 3663, apparatus Micromeritics Tristar 3000: sample preparation at a temperature of 50° C., 6 hours in vacuum.

Pore volume is measured according to ASTM 4641.

Mean particle size is given in μm and measured with Coulter Counter LS200 at room temperature with n-heptane as medium Examples.

Material Description:

Catalyst 3.4 litre of 2-ethylhexanol and 810 ml of propylene glycol butyl monoether (in a molar ratio 4/1) were added to a 20 l reactor. Then 7.8 litre of a 20% solution in toluene of BEM (butyl ethyl magnesium) provided by Crompton GmbH, were slowly added to the well stirred alcohol mixture. During the addition the temperature was kept at 10° C. After addition the temperature of the reaction mixture was raised to 60° C. and mixing was continued at this temperature for 30 minutes. Finally after cooling to room temperature the obtained Mg-alkoxide was transferred to a storage vessel.

21.2 g of Mg alkoxide prepared above was mixed with 4.0 ml bis(2-ethylhexyl) citraconate for 5 min. After mixing the obtained Mg complex was used immediately in the preparation of the catalyst component.

19.5 ml of titanium tetrachloride was placed in a 300 ml reactor equipped with a mechanical stirrer at 25° C. Mixing speed was adjusted to 170 rpm. 26.0 g of Mg-complex prepared above was added within 30 minutes keeping the temperature at 25° C. 3.0 ml of Viscoplex® 1-254 and 1.0 ml of a toluene solution with 2 mg Necadd 447™ was added. Then 24.0 ml of heptane was added to form an emulsion.

Mixing was continued for 30 minutes at 25° C., after which the reactor temperature was raised to 90° C. within 30 minutes. The reaction mixture was stirred for a further 30 minutes at 90° C.

Afterwards stirring was stopped and the reaction mixture was allowed to settle for 15 minutes at 90° C. The solid material was washed 5 times:

Washings were made at 80° C. under stirring for 30 min with 170 rpm. After stirring was stopped the reaction mixture was allowed to settle for 20-30 minutes and followed by siphoning.

Wash 1: Washing was made with a mixture of 100 ml of toluene and 1 ml donor

Wash 2: Washing was made with a mixture of 30 ml of TiCl4 and 1 ml of donor.

Wash 3: Washing was made with 100 ml of toluene.

Wash 4: Washing was made with 60 ml of heptane.

Wash 5: Washing was made with 60 ml of heptane under 10 minutes stirring.

Afterwards stirring was stopped and the reaction mixture was allowed to settle for 10 minutes while decreasing the temperature to 70° C. with subsequent siphoning, followed by N2 sparging for 20 minutes to yield an air sensitive powder.

Ti content was 3.76 wt-%

External Donor:

In the Examples, the external donor D (Dicyclopentyl dimethoxy silane CAS 126990-35-0) was used.

The co-catalyst component used was triethyl aluminium (TEAL).

Polymerization

The polymerization conditions are listed in the Table below.

All examples IE1, IE2, CE1, CE2 were stabilized with
0.1 wt.-% of Irganox B225 (1:1-blend of Irganox 1010 and Irgafos 168) of BASF AG, Germany),
0.05 wt.-% calcium stearate and
2000 ppm Millad 3988 (1,3:2,4 Bis(3,4-dimethylbenzylidene) sorbitol).

The mixture of polymer and additives was then extruded to pellets by using a PRISM TSE16, L/D ratio of screw is 25 extruder under nitrogen atmosphere and final polymer properties were measured.

Comparative Examples CE3 and CE4 were stabilized with 0.1 wt.-% of Irganox B225 (1:1-blend of Irganox 1010 and Irgafos 168) of BASF AG, Germany),
0.05 wt.-% calcium stearate The mixture of polymer and additives was then extruded to pellets by using a PRISM TSE16, L/D ratio of screw is 25 extruder under nitrogen atmosphere and final polymer properties were measured.

Comparative Examples CE5 and CE5 are based on the same polymer as inventive example 1E1 but nucleated with one nucleating agent only.

|  |  | IE1 | IE2 | CE1 | CE2 | CE3 | CE4 | CE5 | CE6 |
|---|---|---|---|---|---|---|---|---|---|
| Catalyst | type | As described above | As described above | ZN, phthalate internal donor | ZN, phthalate internal donor | As described above | As described above | As described above | As described above |
| Ext. donor | type | D | D | C | C | D | D | D | D |
| Al/external donor | mol/mol | 6.7 | 6.8 | 4.0 | 4.0 | 12 | 10 | 6.7 | 6.7 |
| Al/Ti ratio | mol/mol | 233 | 204 | 150 | 150 | 225 | 167 | 233 | 233 |
| Prepoly |  |  |  |  |  |  |  |  |  |
| Temperature | °C. | 30 | 30 | 30 | 30 | 30 | 30 | 30 | 30 |
| Residence time | h | 0.33 | 0.34 | 0.20 | 0.20 | 0.3 | 0.3 | 0.33 | 0.33 |
| R1 (Loop1) |  |  |  |  |  |  |  |  |  |
| Temperature | °C. | 70 | 70 | 75 | 75 | 70 | 70 | 70 | 70 |
| Pressure | kPa | 5500 | 5500 | 5600 | 5600 | 5500 | 5500 | 5500 | 5500 |
| Residence time | h | 0.39 | 0.42 | 0.50 | 0.50 |  |  | 0.39 | 0.39 |
| Split | wt % | 62 | 51 | 50 | 50 | 56 | 55 | 62 | 62 |
| H2/C3 ratio | mol/kmol | 3.54 | 3.97 | 4.05 | 3.12 | 1.6 | 1.0 | 3.54 | 3.54 |
| C2/C3 ratio | mol/kmol | 0 | 0 | 7.96 | 8.75 | 2.2 | 1.9 | 0 | 0 |
| C4/C3 ratio | mol/kmol | 129 | 133 | 0 | 0 | Nd | Nd | 129 | 129 |
| C2 | wt % | 0 | 0 | 3.1 | 3.7 |  |  | 0 | 0 |
| C4 | wt % | 5.4 | 6.2 | 0 | 0 | 6.4 | 3.0 | 5.4 | 5.4 |
| MFR 230° C./2.16 kg | g/10 min | 17.4 | 20.6 | 20 | 13 | 6.4 | 7.2 | 17.4 | 17.4 |
| XCS | wt % | 3.2 | 3.2 | 7.1 | 6.8 | 3.6 | 7.2 | 3.2 | 3.2 |
| R2 (GPR1) except for CE1 and CE2 (Loop2) |  |  |  |  |  |  |  |  |  |
| Temperature | °C. | 80 | 80 | 75 | 75 | 75 | 75 | 80 | 80 |
| Pressure | kPa | 2700 | 2700 | 5600 | 5600 |  |  | 2700 | 2700 |
| Residence time | h | 1.65 | 1.70 | 0.50 | 0.50 |  |  | 1.65 | 1.65 |
| Split | wt % | 38 | 44 | 50 | 50 | 44 | 45 | 38 | 38 |
| H2/C3 ratio | mol/kmol | 40.3 | 41.7 | 4.05 | 3.12 | 18 | 14 | 40.3 | 40.3 |
| C2/C3 ratio | mol/kmol | 0 | 0 | 7.96 | 8.75 | 12 | 10 | 0 | 0 |
| C4/C3 ratio | mol/kmol | 113 | 103 | 0 | 0 | — | — | 113 | 113 |
| C2 made | wt % | 0 | 0 | 3.1 | 3.7 |  |  | 0 | 0 |
| C4 made | wt % | 7.4 | 6.5 | 0 | 0 |  |  | 7.4 | 7.4 |
| MFR made | g/10 min | 23 | 19 | 20 | 13 |  |  | 23 | 23 |
| XCS | wt % | 3.1 | 2.6 | 6.9 | 6.6 |  |  | 3.1 | 3.1 |
| R3 (GPR2) |  |  |  |  |  |  |  |  |  |
| Temperature | °C. | — | 80 | — | — |  |  | — | — |
| Pressure | kPa | — | 2650 | — | — |  |  | — | — |
| Residence time | h | 0 | 0.10 | 0 | 0 |  |  | 0 | 0 |
| Split | wt % | 0 | 5 | 0 | 0 |  |  | 0 | 0 |
| C2/C3 ratio | mol/kmol | — | 80 | — | — |  |  | — | — |
| H2/C2 ratio | mol/kmol | — | 528 | — | — |  |  | — | — |
| C2 made | wt % | — | 13.8 | — | — |  |  | — | — |
| C4 made | wt % | — | 0 | — | — |  |  | — | — |
| MFR made | g/10 min | — | 2.5 | — | — |  |  | — | — |
| Composition |  |  |  |  |  |  |  |  |  |
| MFR 230° C./2.16 kg | g/10 min | 20 | 17.6 | 20 | 13 | 5.0 | 6.8 | 20 | 20 |
| C4 | wt % | 7.4 | 6.0 | 0 | 0 | 6.7 | 3.1 | 7.4 | 7.4 |
| C2 | wt % | 0 | 0.6 | 3.1 | 3.7 | 1.0 | 1.0 | 0 | 0 |
| Tm(DSC) | °C. | 154 | 152 | 150 | 149 | 140 | 149 | 153 | 153 |
| Tc(DSC) | °C. | 121 | 121 | 121 | 121 | 103 | 111 | 110 | 112 |
| Tm − Tc | °C. | 33 | 31 | 29 | 28 | 37 | 38 | 43 | 41 |
| XCS | wt % | 3.1 | 6.3 | 6.9 | 6.6 | 4.4 | 5.2 | nd | nd |
| C6(FDA) | wt % | 1.5 | 1.8 | 2.9 | 2.7 | 2.3 | 2.3 | nd | nd |
| Tensile mod. | MPa | 1556 | 1355 | 1189 | 921 | nd | nd | 1460 | 1473 |
| NIS 23° C. | kJ/m² | 5.2 | 5.7 | 5.0 | 5.3 | nd | nd | 5.0 | 5.2 |
| Haze (1 mm) | % | 22 | 21 | 20 | 23 | nd | nd | 37 | 30 |
| Shrinkage FD | % | 1.34 | 1.35 | 1.37 | 1.34 | nd | nd | nd | nd |

|  |  | IE1 | IE2 | CE1 | CE2 | CE3 | CE4 | CE5 | CE6 |
|---|---|---|---|---|---|---|---|---|---|
| Shrinkage TD | % | 1.53 | 1.53 | 1.53 | 1.53 | nd | nd | nd | nd |
| Nucleation |  |  |  |  |  |  |  |  |  |
| Polyvinylcyclohexane |  | yes | yes | yes | Yes | no | no | Yes | No |
| Amount PVCH | ppm | 15 | 15 | 15 | 15 | 0 | 0 | 15 | 0 |
| DMDBS |  |  |  |  |  |  |  |  |  |
| 1,3:24-Bis (3,4-dimethylobenzylideno) sorbitol |  | yes | yes | yes | Yes | no | no | No | Yes |
| Amount DMDBS | ppm | 1700 | 1700 | 1700 | 1700 | 0 | 0 | 0 | 1700 |

It is recognizable nucleation by the mixture of two nucleating agents together with the catalyst system (having specific Al/external donor ratio and also Al/Ti ratio) surprisingly increases stiffness, melting point Tm and also crystallization temperature even for compositions having better processability, i.e. higher melt flow rate. Simultaneously the C6 solubles (FDA) and haze surprisingly are lowered although the processability is increased. The nucleating mixture (cf. Ex1, CE5, CE6) insofar provides a synergistic effect primarily due to the better balance of stiffness (tensile modulus), impact (NIS) and haze.

The invention claimed is:

1. A propylene butylene polymer composition comprising
   A) a propylene butylene copolymer or a propylene butylene ethylene terpolymer which is
      free of phthalic acid esters as well as decomposition products thereof;
      obtained by a Ziegler-Natta catalyst
   and
   B) a nucleating mixture of at least one particulate nucleating agent and at least one soluble nucleating agent,
   whereby the propylene butylene polymer composition has
      a MFR (2.16 kg/210° C.) in the range of 12 to 50 g/10 min, and
      a tensile modulus (measured on injection moulded test specimens in accordance with ISO 527) of more than 1200 MPa, and
      a Tm of more than 150° C., and
      an amount of xylene cold soluble (XCS) fraction of less than 7.0 wt.-%
   and whereby the propylene butylene copolymer includes monomer units derived from
   a) propylene in an amount of 91-96 wt.-% and
   b) butylene in an amount of 4-9 wt.-%
   with respect to the total weight of the propylene butylene copolymer,
   or wherein the propylene butylene ethylene terpolymer includes monomer units derived from
   a) propylene in an amount of 90-96 wt.-% and
   b) butylene in an amount of 4-9 wt.-% and
   c) ethylene in an amount of not more than 1.0 wt.-%
   with respect to the total weight of the propylene butylene ethylene terpolymer.

2. Composition according to claim 1, having
   a content of hexane hot solubles C6 (FDA) of less than 2.5 wt.-%.

3. Composition according to claim 2, wherein the propylene butylene polymer composition comprises the propylene butylene copolymer, and has
   a tensile modulus (measured on injection moulded test specimens in accordance with ISO 527) of more than 1400 MPa, and
   a Tm of at least 152° C., and
   a C6 (FDA) of below 1.8 wt.-%.

4. Composition according to claim 3 having an amount of xylene cold soluble (XCS) fraction of 2.0 to 4.0 wt.-%.

5. Composition according to claim 2, wherein the propylene butylene polymer composition comprises the propylene butylene ethylene terpolymer, and has
   a tensile modulus (measured on injection moulded test specimens in accordance with ISO 527) of more than 1300 MPa, and
   a Tm of at least 151° C., and
   a C6 (FDA) of below 2.0 wt.-%.

6. Composition according to claim 5 having an amount of xylene cold soluble (XCS) fraction of 4.0 to 6.8 wt.-%.

7. Composition according to claim 1 having a crystallisation temperature Tc of more than 118° C.

8. Composition according to claim 1, whereby the nucleating mixture is a mixture of (i) a trisamide or sorbitol derivative soluble nucleating agent and (ii) a polymeric particulate nucleating agent.

9. Composition according to claim 8, whereby the amount of the trisamide or sorbitol derivative soluble nucleating agent is 500 to 10000 ppm with respect to the propylene butylene polymer composition.

10. Composition according to claim 8, whereby the amount of the polymeric particulate nucleating agent is 10 to 3000 ppm with respect to the propylene butylene polymer composition.

11. Process for the preparation of a propylene butylene copolymer composition comprising
   (A) a propylene butylene copolymer which is free of phthalic acid esters as well as decomposition products thereof and
   (B) a nucleating mixture of at least one particulate nucleating agent and at least one soluble nucleating agent,
   whereby the propylene butylene copolymer composition has
      a MFR (2.16 kg/210° C.) in the range of 12 to 50 g/10 min, and
      a tensile modulus (measured on injection moulded test specimens in accordance with ISO 527) of more than 1200 MPa, and
      a Tm of more than 150° C., and
      an amount of xylene cold soluble (XCS) fraction of less than 7.0 wt.-%
   and whereby the propylene butylene copolymer includes monomer units derived from
   a) propylene in an amount of 91-96 wt.-% and
   b) butylene in an amount of 4-9 wt.-%
   with respect to the total weight of the propylene butylene copolymer;
   the process comprising
   polymerizing propylene and butylene in a two reactors coupled in series using a Ziegler Natta catalyst system
having citraconate as internal donor, an organoaluminum compound as co-catalyst, and an organosilane as external donor at a Al/external donor ratio of 5.0-8.0 mol/mol and a Al/Ti ratio of 190 to 240 mol/mol, and further feeding the at least one particulate nucleating agent to at least one reactor,
whereby in a first reactor a pre-polymerization is carried out at 25-35° C. for 10 to 60 minutes yielding a pre-polymer,
further polymerizing the pre-polymer at a temperature of 65-75° C., at a C4/C3 ratio of 115 to 145 mol/kmol yielding a first intermediate having an C4 content of 4 to 7 wt.-% and XCS of 2 to 5 wt.-%,
transferring the first intermediate to a second reactor and further polymerizing at 75 to 85° C. at a C4/C3 ratio of 90 to 130 mol/kmol,
to yield the second reactor product,
extruding the second reactor product in the presence of the at least one soluble nucleating agent to yield the propylene butylene copolymer composition.

12. Process for the preparation of a propylene butylene ethylene terpolymer composition comprising
A) a propylene butylene ethylene terpolymer which is free of phthalic acid esters as well as decomposition products thereof;
and
B) a nucleating mixture of at least one particulate nucleating agent and at least one soluble nucleating agent,
whereby the propylene butylene ethylene terpolymer composition has
a MFR (2.16 kg/210° C.) in the range of 12 to 50 g/10 min, and
a tensile modulus (measured on injection moulded test specimens in accordance with ISO 527) of more than 1200 MPa, and
a Tm of more than 150° C., and
an amount of xylene cold soluble (XCS) fraction of less than 7.0 wt.-%
and
wherein the propylene butylene ethylene terpolymer includes monomer units derived from a) propylene in an amount of 90-96 wt.-% and
b) butylene in an amount of 4-9 wt.-% and
c) ethylene in an amount of not more than 1.0 wt.-%
with respect to the total weight of the propylene butylene ethylene terpolymer;
the process comprising
polymerizing propylene, butylene, and ethylene in three reactors coupled in series
using a Ziegler Natta catalyst system
having citraconate as internal donor, an organoaluminum compound, and an organosilane as external donor at a Al/external donor ratio of 5.0-8.0 mol/mol and a Al/Ti ratio of 190 to 240 mol/mol, and further feeding the at least one particulate nucleating agent to at least one reactor,
whereby in a first reactor a pre-polymerization is carried out at 25-35° C. for 10 to 60 minutes yielding a pre-polymer,
further polymerizing the pre-polymer at a temperature of 65-75° C., at a C4/C3 ratio of 115 to 145 mol/kmol yielding a first intermediate having an C4 content of 4 to 7 wt.-% and XCS of 2 to 5 wt.-%,
transferring the first intermediate to a second reactor and further polymerizing at 75 to 85° C. at a C4/C3 ratio of 80 to 120 mol/kmol to yield the second reactor product,
transferring the second reactor product to a third reactor and further polymerizing at a temperature of 75 to 85° C. at a C2/C3 ratio of 70 to 90 mol/kmol to yield a third reactor product, and
extruding the third reactor product in the presence of the at least one soluble nucleating agent.

13. The propylene butylene copolymer composition obtained by the process of claim 11.

14. Molded article comprising the composition of claim 1.

15. The molded article according to claim 14, wherein the composition has a haze (1 mm plaque) of less than 23%, a FD shrinkage of less than 1.38% and a TD shrinkage of less than 1.55 and further optionally the composition has a notched impact strength (23° C.) of at least 5.0 kJ/m$^2$.

* * * * *